Aug. 18, 1942.  P. W. THORNHILL  2,293,226
FLUID PRESSURE REMOTE CONTROL SYSTEM
Filed Nov. 8, 1940   3 Sheets-Sheet 1

Inventor
Peter W. Thornhill
By Martin J. Finnegan,
attorney

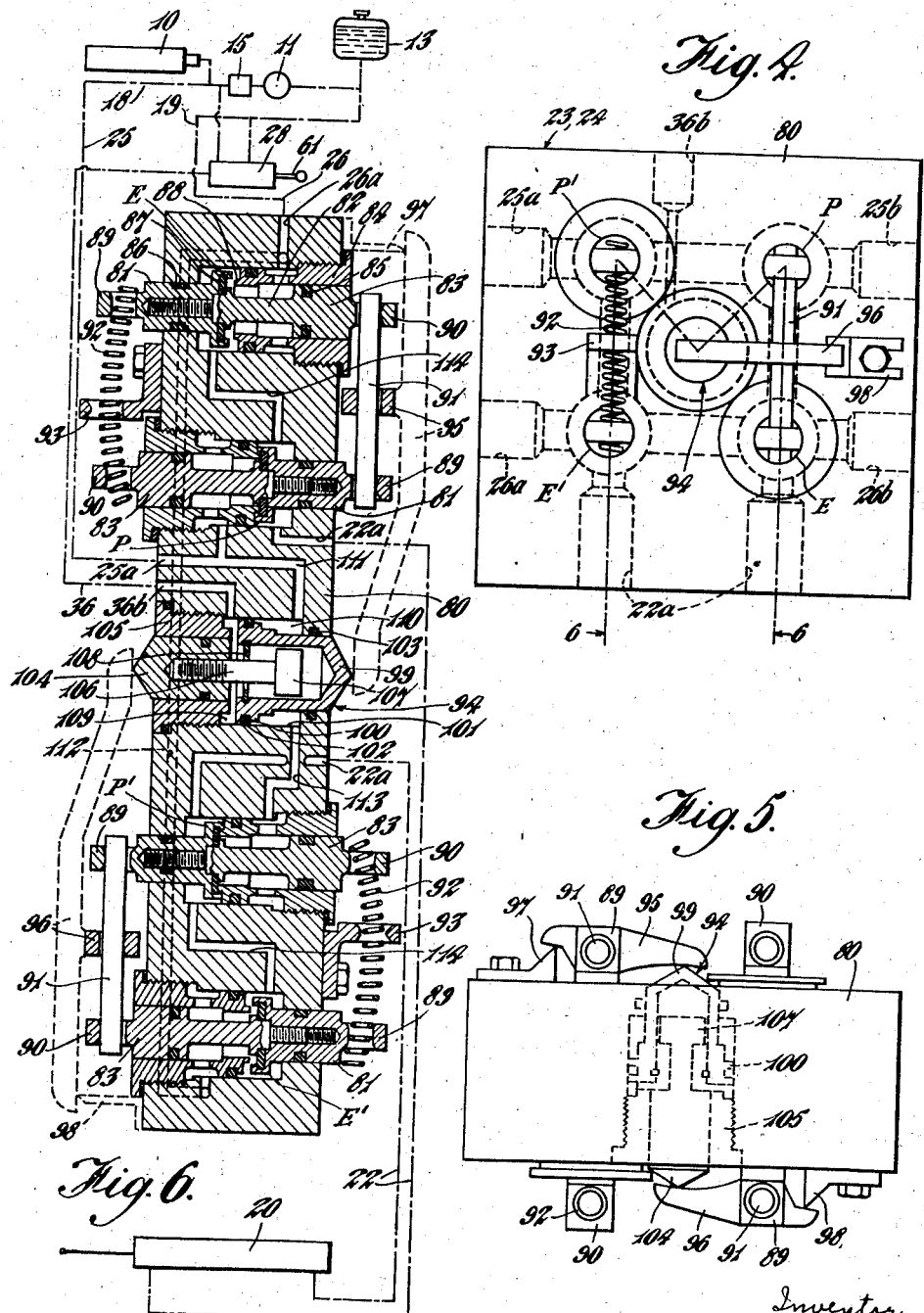

Aug. 18, 1942.  P. W. THORNHILL  2,293,226
FLUID PRESSURE REMOTE CONTROL SYSTEM
Filed Nov. 8, 1940   3 Sheets-Sheet 3
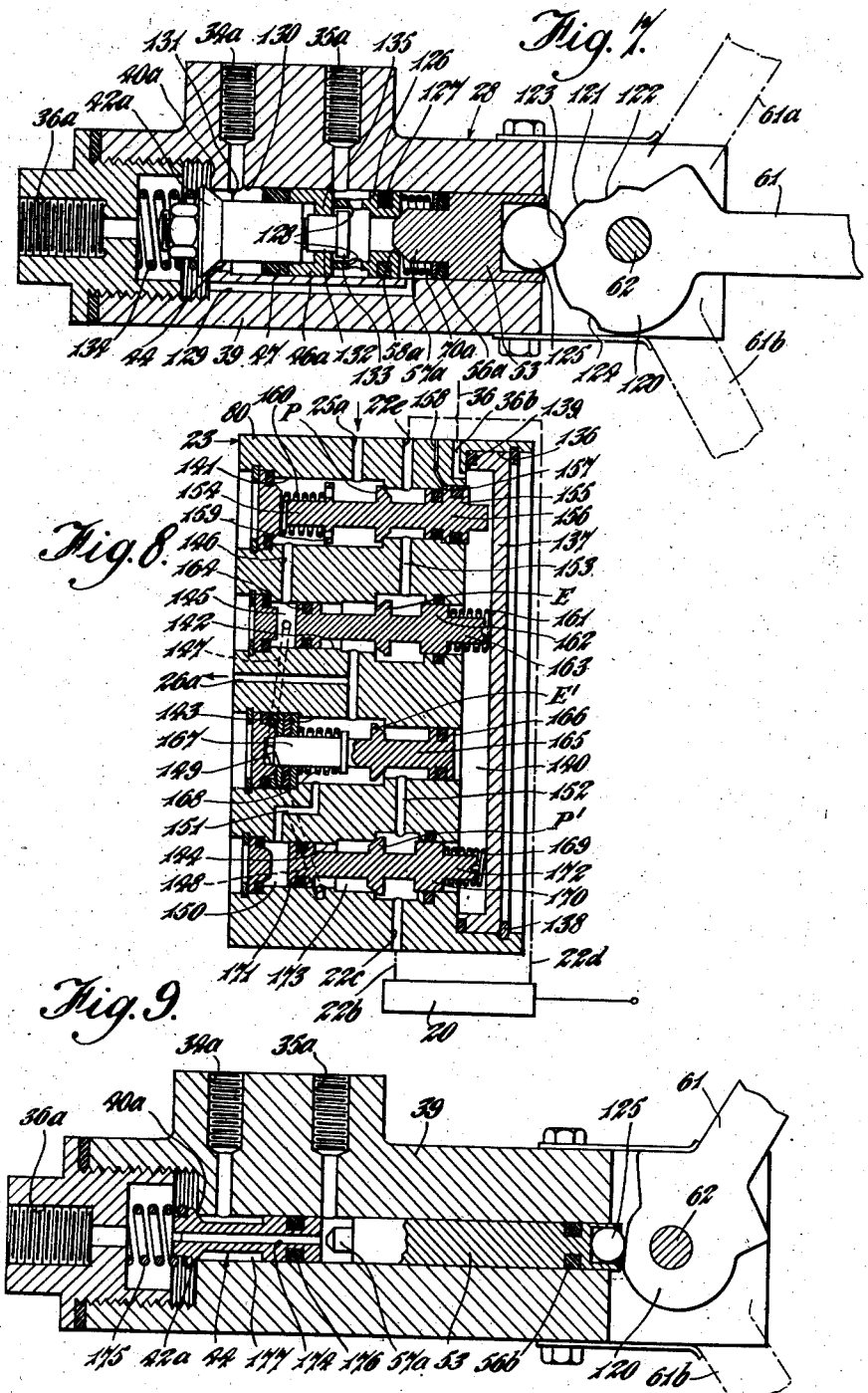
Inventor
Peter W. Thornhill
By Martin J. Finnegan
Attorney Patented Aug. 18, 1942

2,293,226

UNITED STATES PATENT OFFICE 2,293,226

FLUID PRESSURE REMOTE CONTROL SYSTEM

Peter Warborn Thornhill, London, England, assignor to Automotive Products Company Limited, London, England Application November 8, 1940, Serial No. 364,942
In Great Britain November 8, 1939

2 Claims. (Cl. 121—38)

This invention relates to fluid pressure remote control systems and particularly to those systems where a number of jacks or equivalent motor units are arranged to be operated from a common source of pressure fluid under the control of selector valves disposed remotely from the jacks or equivalent.

An object of the invention is to provide in an improved liquid pressure remote control system of the double-acting variety, novel means for actuating the selector valve or valves; the result being to render the system particularly suitable for use on aircraft where a number of controlled devices, such as retractable undercarriage units, flaps and/or a retractable tail wheel, are arranged to be operated by pressure liquid supplied from a common source.

Another object is to provide, for use in such a system, a reversible control valve operable by the fluid pressure in a single pipe line.

A further object is to provide a selector valve device operable to vary the fluid pressure in said single pipe line and thereby bring about the actuation of the reversible control valve.

Another object is to provide a selector valve operable to modify the pressure in said single pipe line in accordance with the position in which its selector lever or equivalent is placed.

A further object is to provide for use in a fluid pressure remote control system having a motor unit arranged to be fed with pressure fluid from a source through the medium of a control valve device, novel means for actuating the control valve device by pressure fluid fed to the control valve device from the same source as the motor unit.

Another object is to provide a control valve device operable in one direction by pressure fluid at full supply pressure, and in the other direction by pressure fluid at variable pressures, the position occupied by said control valve device thus being substantially wholly dependent upon the relationship which the momentarily applied pressure bears to the full pressure prevailing at the source.

Another object is to provide a selector valve operable in at least one setting to reduce the pressure of the liquid to a predetermined proportion of its value as received, said proportion being substantially unaffected by variations in the supply pressure.

The invention is illustrated by way of example in the accompanying drawings, in which:

Figure 1 is a diagrammatic representation of an improved liquid pressure remote control system;

Figure 2 is a sectional view of one of the selector valves shown in its "off" position;

Figure 3 is a view similar to Figure 2, but showing the selector valve in an operating position;

Figure 4 is a front elevation of one of the control valve devices;

Figure 5 is a plan of the valve device shown in Figure 4;

Figure 6 is a sectional view taken on the line 6—6 of Figure 4 and showing the interior construction of the control valve device, the connections, however, being indicated diagrammatically;

Figure 7 is a sectional elevation of a modified construction of selector valve;

Figure 8 is a diagrammatic representation of a form of control valve device suitable for use with the selector valve shown in Figure 7; and Figure 9 is a sectional view of another form of selector valve primarily for use with the control valve device shown in Figure 8.

The system which is shown diagrammatically in Figure 1 comprises a hydraulic accumulator 10, which is charged by a pump 11 and which serves as a source of pressure liquid. The inlet connection 12 of the pump is connected with a reservoir 13, while the delivery connection 14 leads to a cut-out valve device 15 of any convenient form. Pressure liquid passes as required through a connection 16 leading to the accumulator 10 and when pressure in the latter reaches a predetermined value the output from the pump 11 is returned by way of a connection 17 to the reservoir 13 in the known manner. The outlet from the hydraulic accumulator 10 is permanently connected with a main pressure pipe line 18, while a main return pipe line 19 serves to take the rejected liquid back to the pump inlet 12 and the reservoir 13. The system shown is adapted to operate a number of double-acting motor units in the form of jacks, two of which are indicated at 20 and 21, these being each connected by a pair of pipe lines 22 in the usual manner with corresponding control valve devices 23 and 24 respectively. Each of these control valve devices is coupled with the main pressure pipe line 18 by means of a connection 25 and with the return pipe line 19 by a connection 26. The connections 25 and 26 are, of course, adapted to carry the maximum flow of working liquid required by the corresponding jack 20 or 21.

The control valve devices of the system are operated remotely from a bank of selector valves indicated generally at 27, the individual valves 28, 29, 30, 31, 32 and 33 conveniently being joined together to form a unit which is coupled with the main pressure pipe line 18 and with the return pipe line 19 by connections 34 and 35 respectively, whereby the selector valves 28–33 are fed in common from the hydraulic accumulator 10. Each selector valve actuates its corresponding control valve device by pressure liquid transmitted through a single pipe line, which latter can be of quite small diameter, as it has to transmit only a little liquid. Thus a single pipe line 36 leads from the selector valve 28 to the control valve device 23, while a single pipe line 37 similarly connects the selector valve 33 to the control valve device 24. Other single pipe lines from the remaining selector valves are indicated at 38 and lead to corresponding control valve devices (not shown).

The internal construction of each of the selector valves is shown diagrammatically in Figures 2 and 3. A selector valve body 39 has an inlet 34a for pressure liquid and a return connection 35a, while an end connection 36a is adapted to lead to the corresponding single pipe line, such as 36. An annular seating member 40 conveniently of L-shape in radial section is secured at a position between the connections 34a and 36a within a longitudinal bore 41 extending through said body. A mushroom valve member 44 is disposed within the bore 41 and has a head 42 grooved to receive a rubber seating washer 45, while its stem 43 passes slidably through a secondary plunger 46, itself fitting slidably within the bore 41 and having a rubber washer 47 to prevent leakage of liquid past the two pairs of sliding surfaces. The mushroom valve stem 43 is formed with an enlargement 48, which is adapted to be engaged by a shoulder 49 formed within the secondary plunger, while said stem also has an axial bore 50 extending from the head 42 and leading out through radial passages 51. The extremity of the stem 43 fits slidably within a bore 52 formed in an end plunger 53, a vent passage 54 enabling the space within the bore 52 to be maintained at atmospheric pressure. A packing ring 55 prevents leakage of liquid past the stem 43, while an outer packing 56 is provided between the end plunger 53 and the bore 41. The end plunger 53 is formed with a tubular extension 57, the annular end surface of which is adapted to engage a rubber washer 58 set into an annular recess formed in the adjacent end of the secondary plunger 46, the parts 57 and 58 thus acting in the capacity of a valve, which isolates the bore 50 from the return connection 35a. A flange 59 upon the extension 57 is adapted to co-operate with the end surface 60 of the secondary plunger 46 in order that substantial thrust may be transmitted without damaging the rubber washer 58.

The selector valve body 39 is bifurcated at one end to receive a selector handle or lever 61, which is pivoted at 62 and is formed with a pair of abutment pivots 63 and 64 which are in the nature of cylindrical rods extending parallel with the pivot 62, although they are disposed at different distances from said pivot, the member 63 being closer thereto than is the member 64. A substantially triangular thrust member 65 constitutes a mechanical connection between the selector handle 61 and the end plunger 53, the latter being formed with a recess 66 for the rocking reception of the apex portion 67 of the thrust member 65. At its opposite part the thrust member 65 is formed with a pair of semi-circular grooves 68 and 69 adapted to mate simultaneously with the abutment pivots 63 and 64 when the selector valve is in its "off" position, as seen in Figure 2. The thrust member 65 is at all times urged towards the selector handle 61 by a coiled compression spring 70 acting upon a flange 71 on the end plunger 53.

When the selector valve is "off," as in Figure 2, the tubular extension 57 is free of the washer 58, thus placing the connection 36a and the corresponding single pipe line in free communication with the reservoir 13 by way of the bore 50 extending longitudinally through the mushroom valve 44. At the same time liquid from the pressure source is present in the connection 34a and acts upon the washer 47, thus forcing the secondary plunger against the enlargement 48 and so holding the head 42 of the mushroom valve member firmly upon its seating 40. It is to be observed that the pressure liquid also acts upon the annular surface of the head 42 disposed "within" the seating 40, but the area of this annulus is smaller than that of the washer 47.

When the selector handle 61 is moved upwards to the position shown in Figure 3 the selector valve acts in the capacity of a pressure reducing valve and admits to the single pipe line only sufficient liquid to build up the pressure therein to a value which is a predetermined proportion, say half, of that in the main pressure pipe line 18. As the selector handle 61 is moved to this position the abutment pivot 63 bears upon the thrust member 65, thus causing the latter to advance the end plunger 53. The tubular extension 57 thereon engages the washer 58 of the secondary plunger 46, thus shutting off the connection 35a leading to the reservoir 13. The abutment pivot 63 reaches a substantially dead centre position as the handle 61 engages a stop 72, and during this movement the end plunger 53 advances the secondary plunger 46 to an extent sufficient to produce a clearance 73 between the shoulder 49 and the enlargement 48. In this way the force of the pressure liquid acting upon the secondary plunger 46 is borne by the end plunger 53 and this force is no longer available for closing the mushroom valve 44. The axially facing surface 74 of the seating member 40, i. e. the seating proper, is of course annular in form, and its outer and inner diameters are arranged, in conjunction with the diameter of the stem 43, so that the desired pressure drop is produced. Thus when the selector handle 61 is moved to the position shown in Figure 3, pressure liquid acting upon the annular surface of the head 42 within the seating member 40 is able to move the head 42 away from the surface 74, and said pressure liquid then flows through the connection 36a into the single pipe line. As the pressure builds up in said single pipe line it effectively acts upon an area of the head 42 equal to the area of a circle whose diameter corresponds with that of the outside of the annular surface 74, and thus a relatively small pressure in the single pipe line is able to re-close the mushroom valve 44 against the full supply pressure acting "inside" the seating member 40. It will be noted that the single pipe line 36 communicates with that area of the washer 58 disposed within the extension 57 and the said area is arranged so that if the pressure in the single pipe line 36 rises unduly above the proportional value, it urges the secondary plunger 46 away from the end plunger 53, thus allowing liquid to escape from the single pipe line 36 back to the reservoir 13 by way of the connection 35a until the desired pressure value is reached in said single pipe line 36. Thus if leakage should occur between the valve head 42 and the seating member 40, this will not cause the control valve device 23 to be operated wrongly by raising the pressure in the single pipe line 36.

In the opposite position of the selector handle 61, i. e. when it is moved downwards to engage with a second stop 75, the abutment pivot 64 urges the thrust member 65 further to the left than previously, thus additionally advancing the end plunger 53 and the secondary plunger 46. A shoulder 76 upon said secondary plunger is thus caused to engage with the enlargement 48 of the mushroom valve 44 and force the head 42 of the latter positively away from the seating member 40. The connection to the reservoir of course remains closed and consequently full supply pressure is freely admitted to the single pipe line through the connection 36a.

The construction and arrangement of each of the control valve devices 23 and 24 are shown in Figures 4, 5 and 6. A control valve body 80 has a connection 36b for the single pipe line. The connections 25a and 26a are coupled by the pipes 25 and 26 respectively to the main pressure and return pipe lines 18 and 19. Alternative connections 25b and 26b are provided for convenience, those connections not required being, of course, suitably blocked. A pair of connections 22a are intended for the pipes 22 leading to the corresponding jacks 20 or 21 of the system. The body 80 is drilled for the slidable accommodation of four valve members, two of which, namely P and P', are arranged to control the supply of pressure liquid to the motor unit connections 22a, while the other two valve members, E and E', are provided to permit rejected or exhaust liquid to pass back freely to the reservoir 13. Each of the valves E, P, P' and E' is formed in two main parts, namely a head portion 81 and a stem portion 82, the latter having a plunger-like enlargement 83 sliding within a plug 84 screwed into the body 80, a packing washer 85 being provided to prevent leakage of liquid past the relatively sliding surfaces. A similar packing washer 86 is provided around the head portion 81, which also slides within the body 80. Moreover the diameter of the head portion 81 is made slightly smaller than that of the enlargement 83, so that when the valve is open the liquid pressure surrounding the valve member has a slight tendency urging it towards its closed position. Each of the valves E, P, P' and E' has a rubber or like washer 87 clamped between its two parts 81 and 82 and adapted to engage with an upstanding annular seating 88 formed upon the plug 84. The parts 81 and 83 of each valve are formed where they project from the body 80 with perforated lugs 89 and 90 respectively. The valves are arranged oppositely in pairs, E, P and E', P', and the valves of each pair are connected together at one end by a rod 91 and at the other end by a coiled spring 92, which latter is supported intermediate its length by a perforated bracket 93 so as to draw the valve members E and P gently towards the left, while the valve members P' and E' are similarly drawn towards the right, as seen in Figure 6. The valves are actuated through the medium of the rods 91 by means of a control valve motor unit indicated generally at 94, the operative connections being provided by a pair of levers 95 and 96, which are shown diagrammatically in Figure 6. The actual arrangement is shown in Figure 5, from which it will be seen that the levers 95 and 96 have their outer ends supported pivotally by fulcrum brackets 97 and 98 secured to the body 80.

The control valve motor unit 94 comprises a somewhat thimble-shaped major plunger 99 having at its "rim" a radial flange 100 sliding within a bore 101 formed in the body 80, packing washers 102 and 103 being provided. A minor plunger 104 is also slidable within a plug 105 screwed into the bore 101, said minor plunger being fitted with a stem 106 having a head 107 slidable with clearance along the interior of the major plunger 99. The "underneath" of the head 107 is adapted to engage with an abutment ring 108, thus producing the effect of a lost motion connection between the major and minor plungers 99 and 104. The outer end of each of these plungers is pointed and engages with the corresponding lever 95 or 96. A working space 109 between the major and minor plungers is in permanent communication with the single pipe line indicated at 36 by way of the connection 36b, while an annular working space 110 surrounding the major plunger 99 is continuously maintained at full supply pressure by a connection 111 leading to the pressure source.

The control valve motor unit 94, shown in Figures 5 and 6, is arranged so that when the selector valve 28 acts in the capacity of a reducing valve to limit the pressure liquid in the single pipe line 36 to substantially one half of the full supply pressure, the minor plunger 104 is advanced so as to actuate the lever 96, but when full supply pressure is present in the single pipe line 36 the minor plunger 104 is retracted and the major plunger 99 is advanced to operate the lever 95. In order that this effect may be produced the cross-sectional area of the bore 101 is arranged to be three times that of the minor plunger 104, and the cross-sectional area of the annular working space 110 is 1½ times the area of the minor plunger 104. Thus the minor plunger 104 can be regarded as having one unit of cross-sectional area, in which case the bore 101 would be 3 units and the annular working space 110 would have 1½ units. The full supply pressure is always present in the working space 110, so that the major plunger 99 always tends to be retracted by what may be regarded as 1½ units of force. When there is zero pressure in the single pipe line 36 both plungers 99 and 104 occupy their retracted positions, as shown in Figure 6. The admission of half-pressure to the single pipe line 36 causes the minor plunger 104 to be advanced, the force on said plunger amounting to half unit. It will be seen that the liquid pressure acts also upon the major plunger 99 across its 3 units of area, but as the liquid in the single pipe line is at only half-supply pressure, the result is 1½ units of force acting towards the right, and this is of course insufficient to overcome the 1½ units of force tending to retract the major plunger 99. When the pressure in the single pipe line 36 is increased to the full value of the supply the major plunger 99 is advanced; the force of 3 units acts upon the major plunger 99 and this tends to advance said plunger, but is opposed by 1½ units of force acting in the annular working space 110, while in addition the full supply pressure acting upon the minor plunger 104 creates an opposing force amounting to one unit. The lost motion connection 107, 108 prevents both plungers from being advanced at the same time and the net result is that the major plunger 99 is advanced with a force equal to half unit, which, it will be observed, is the same value as the force with which the minor plunger 104 is advanced when half-pressure is supplied to the control valve motor unit 94 through the single pipe line 36.

The parts of the control valve device are shown in Figure 6 in the positions which they occupy when the handle 61 of the selector valve 28 is in its central "off" position. The pressure valves P and P' are both closed owing to the action of the springs 92, the valves themselves being balanced owing to the fact that the supply pressure acting upon the surface of the plunger member 83 completely counteracts any tendency for said supply pressure to open the valve. The exhaust valves E and E', which are connected together by a passage indicated in dotted lines at 112 are, however, both open and permit the jack or motor unit 20, with its pipe lines 22, to communicate freely with the reservoir 13 so as to compensate in the known manner for leakage of liquid and volumetric changes due to temperature variations. By moving the handle 61 to its upper position liquid at half-pressure is supplied to the single pipe line 36, as previously explained, and this causes the minor plunger 104 to be advanced, thus moving both of the valves P' and E' to the left, as seen in Figure 6. The exhaust valve E' is closed, and the opening of the valve P' permits pressure liquid to flow through the connection 111 and a passageway 113 past the valve P' and thence through the corresponding connection 22a to the jack 20. Liquid rejected by said jack passes, of course, into the other connection 22a and then by way of a connecting passage 114 through the valve E and back to the reservoir by way of the pipes 26 and 19. The valves E and P are brought into action in a similar manner by moving the handle 61 to its down position, thus supplying full pressure to the single pipe line 36 and causing the major plunger 99 to be advanced. This, of course, closes the valve E and at the same time opens the valve P. The actual arrangement of the valves is shown in Figure 4, from which it will be seen that they are disposed with their axes parallel and surround the control valve motor unit 94.

A system arranged in a manner similar to that shown in Figure 1 can utilise selector valves and control valve devices of modified construction, as illustrated in Figures 7 and 8 respectively. The control valve device is arranged to secure its "off" or inoperative position when fed with half-supply pressure through the single pipe line, the handle 61 of the selector valve 28 being in its mid position as shown. Raising the handle to the position indicated at 61a places the single pipe line into communication with the reservoir 13, and causes the control valve device 23 to feed pressure liquid in one direction to the jack 20; lowering the handle 61 to the position shown at 61b causes full pressure to be delivered to the single pipe line 36 and operates the control valve device 23 in the opposite sense so that the jack 20 is driven in the reverse direction.

The selector valve shown in Figure 7 operates on the same principle as that shown in Figures 2 and 3, but its construction is slightly different. The handle 61 is mounted upon a pivot 62 and is formed with a cam 120 having a somewhat involute profile 121 formed with three arcuate notches 122, 123, 124, whereby the end plunger 53 is progressively advanced as the handle 61 is moved from its position 61a to the position 61b, said notches being engaged by a ball 125 fitted into a recess in the end of the plunger 53. The end plunger 53 is formed with an axial spigot 57a having a frusto-conical extremity adapted to act as a valve member cooperating with a seating 58a upon an intermediate member 126 provided with a packing washer 127. A coiled compression spring 70a acts between the intermediate member 126 and the end plunger 53, a rubber packing washer 56a being interposed. The intermediate member 126 is drilled radially at 128, while the body 39 is drilled longitudinally at 129 to provide communication between the connection 36a and the space surrounding the spigot 57a. Thus the engagement of the spigot 57a with the seating 58a cuts off communication with the single pipe line 36 and the connection 35a leading to the reservoir 13. The valve member 44 is again of mushroom form, but is simpler in construction and has a frusto-conical head 42a adapted to engage with a seating 40a formed integrally with the body 39, the diameter of the seating 40a being slightly smaller than that of the main bore 130 owing to the provision of a shoulder 131. The secondary plunger, indicated at 46a co-operates with a rubber ring 47 as before and is flanged inwards at its opposite end 135 to slide upon a stud 132 having a head 133. The valve member 44 is urged towards its closed position by a spring 134.

The parts are shown in Figure 7 in the positions which they occupy when the selector valve is in its "off" position, i. e. when the proportional pressure is present in the single pipe line 36. The valve seating 58a is closed by the spigot 57a, thus isolating the single pipe line 36 from the reservoir 13, and the secondary plunger is held away from the head 133 by the intermediate member 126, which in turn is supported by the end plunger 53, the ball 125, the cam 120, and the pivot 62. Thus pressure liquid fed into the connection 34a is free to force open the valve member 44 against the action of the relatively light spring 134 until such time as the pressure in the single pipe line reaches a predetermined value, at which point the pressure in said single pipe line 36, acting over the greater part of the head 42a, closes the valve member 44. Should the pressure in the single pipe line 36 tend to rise, for instance on account of leakage past the valve seating 40a, said increased pressure, by acting upon the annular end surface of the intermediate member 126, is able to overcome the supply pressure acting upon the washer 47, and so move the intermediate member 126 away from the spigot 57a, thus permitting liquid to escape from the single pipe line 36 until the proper proportional pressure is restored. To admit full pressure to the single pipe line 36 the handle 61 is moved to the position 61b and the further advancement of the end plunger 53 causes the flanged portion 135 of the secondary plunger to bear against the end of the valve member 44, thus positively opening the latter and providing continuous communication between the connections 34a and 36a. Raising the handle 61 to the position 61a enables the spring 70a to force back the end plunger 53 so as to create a passage through the valve seat 58a, thus placing the single pipe line in communication with the reservoir connection 35a. At the same time the flange 135 of the secondary plunger 46a bears against the head 133 under the force exerted by the pressure liquid upon the washer 47, said pressure liquid from the main supply thus serving to hold the valve 44 closed, more especially on account of the fact that the seating 40a is smaller in diameter than the bore 130.

The corresponding control valve device shown in Figure 8 comprises a body 80 formed with a recess 136 which is closed by a cap member 137 held in position by a locking ring or equivalent 138, while leakage is prevented by a rubber or like ring 139. This forms a chamber 140, which communicates by way of a connection 36b with the single pipe line indicated at 36. The body 80 is formed with four mutually parallel bores which are indicated generally at 141, 142, 143 and 144, each of these being arranged to open into the chamber 140 and being provided with an axially slidable valve member. These, as in the previous example, are indicated at P, E, E' and P'. The inlet for pressure liquid is indicated at 25a, said liquid being at all times free to pass to a working space 145 by way of a connection 146 and thence through a passage 147 to a working space 149 associated with the valve E', while a further passage 148 leads to the valve P'. In a similar manner the connection for return liquid is indicated at 26a, and as well as leading to the valves E and E', said connection is in communication with a working space 150 associated with the valve P', a passage 151 being provided for this purpose. The jack 20 of the system has one of its pipe lines, indicated at 22b, in communication with the valve P' by way of a connection 22c, while it also communicates by way of a passage 152 with the valve E'. Similarly the second pipe line 22d enters the body 80 at 22e leading to the valve P and it also communicates by a passage 153 with the valve E. As will be clearly seen in the drawing, all the valves are of mushroom form, but in each case the stem is extended beyond the "head" portion, said stems being formed with pistons or plungers, which are acted upon by fluid pressure in order to secure the desired operation, depending upon the liquid pressure which is present in the single pipe line 36.

Thus the stem 154 of the valve P is provided with a large diameter piston portion 155 and an immediately adjacent smaller piston portion 156, the annular space 157 in the bore caused by the difference in their diameters being connected with the atmosphere by a vent passage 158. The piston 156 is, of course, equal in diameter to the seating of the valve P, while the piston 155 is, of course, larger. A perforated guide 159 adjacent the opposite end of the stem 154 serves to support the valve and also acts as an abutment for a light coiled compression spring 160 urging the valve P towards its closed position.

The valve E is also urged towards its closed position by a spring 161 acting upon a plunger 162, which latter is formed on the stem 163 of the valve and has a diameter equal to the seating of the valve E. At its opposite end the stem 163 is formed with a piston 164, which is of smaller diameter than the plunger 162.

The valve E' has a stem 165 formed on one end with a piston 166 equal in diameter to the seating of the valve, while its other end acts as a relatively small plunger 167 and is surrounded by a coiled compression spring 168 urging the valve E' to its closed position.

The valve P' is also urged towards its closed position by a spring 169 and has adjacent the chamber 140 a plunger 170, while its stem 172 has at its opposite end a piston 171 of smaller diameter than the plunger 170.

The action of the control valve shown in Figure 8 is briefly as follows. The parts are shown in the positions which they occupy when the valve is "off," i. e. when the handle 61 of the selector valve is in its mid position, as shown in Figure 7, so that half-supply pressure is fed through the single pipe line 36. The valve P is closed, as the half-pressure which is present in the chamber 140 and which acts upon the piston 155 is insufficient to overcome the supply pressure acting to close the valve P. The valve E is open, as the supply pressure acting upon the piston 164 is able to overcome the half-pressure in the chamber 140 acting upon the slightly larger plunger 162. The valve E' is also open, as in this case the piston 166, subject to the half-pressure in the chamber 140, is able to overcome the spring 168 and the force exerted upon the plunger 167 by the supply pressure in the working space 149. The valve P' is closed, as the half-pressure acting upon the plunger 170 is able to overcome the slight valve "opening" force exerted by the supply pressure acting within the annular space indicated at 173, this force, of course, being due to the fact that the seating of the valve P' is larger in diameter than the piston 171.

When the handle 61 of the selector valve 28 is raised the pressure in the single pipe line 36 falls to zero and the control valve 23 operates to direct the pressure liquid through the pipe line 22b of the jack 20. As before, each valve takes up its own position, dependent upon the pressures acting on it. Thus the valve P remains closed in the entire absence of pressure in the chamber 140, and for a similar reason the valve E remains open. The valve E' closes, however, under the action of the supply pressure within the working space 149, as this supply pressure is no longer overcome by force exerted upon the piston 166. The valve P' opens, as the force on the plunger 170 is removed and the supply liquid in the annular space 173 acts to open the valve against the force of the spring 169.

The opposite effect is produced by depressing the handle 61 of the selector valve 28 so as to deliver full supply pressure to the single pipe line 36 and to the chamber 140. The valve P is opened, as the area of the piston 155 is greater than that of the seating of the valve. The valve E is closed, as the plunger 162, subject to the supply pressure in the chamber 140, is larger in area than the piston 164, which is also acted upon by the supply pressure, but in the opposite direction. The valve E' is opened, as the piston 166 is acted upon by the supply pressure in the chamber 140 and is larger than the plunger 167 at the opposite end of the valve stem 165. The valve P' is closed, as the supply pressure in the chamber 140 acts upon the whole area of the plunger 170 and creates a "closing" force greater than the "opening" force produced by the supply pressure within the annular working space 173.

In certain circumstances it may not be necessary to cut off the supply of pressure liquid to the motor cylinder unit or units of the system, the selector valve or valves in these circumstances being provided with only two positions, namely those corresponding with the positions 61a and 61b in Figure 7. With the control valve device shown in Figure 8 this means that the single pipe line 36 is either open to the reservoir 13 or is charged to full supply pressure. A simpler form of selector valve can consequently be used, and one example is shown in Figure 9. The selector valve comprises a body 39 having a handle 61 pivoted at 62 as before. In this case, however, the cam 120 has a relatively smooth periphery of somewhat involute shape adapted to co-operate with the ball 125 and advance the end plunger 53 as the handle 61 is moved to the position indicated at 61b. A packing washer 56b prevents leakage of liquid past the end plunger 53 and the latter is formed at its opposite end with a spigot 57a having a pointed or frusto-conical extremity adapted to act as a valve member closing a bore 174 extending longitudinally through a mushroom valve member 44. This member has a head 42a which is urged firmly against a seating 40a in the body 39 by a coiled compression spring 175. The valve member 44 is provided with a packing ring 176 and is reduced in diameter adjacent its head to produce an annular space 177 which is in permanent communication with the pressure source by way of the connection 34a. The connection 35a leads as before to the reservoir 13. Thus with the handle 61 in its raised position, as shown, the connection 36a leading to the single pipe line 36 is in free communication with the reservoir as the spigot 57a is spaced from the end of the valve member 44. By moving the handle 61 to the position 61b the end plunger 53 is advanced, thus closing the bore 174 and at the same time forcing the valve 44 to its open position; this, of course, places the single pipe line 36 into direct communication with the main supply of pressure liquid. In installations having a plurality of selector valves it is of course possible to use the two kinds of selector valves shown in Figures 7 and 9, the particular valves employed depending upon the kind of operation that is required of the jack or motor unit concerned.

The constructions described are, of course, given merely as examples of the invention and it will be realised that various modifications may be made with a view to adapting the system to particular requirements.

What I claim is:

1. In a fluid pressure remote control system, the combination, with a double-acting motor unit having a pair of inlet ports of a source of fluid pressure, a selector valve, a supply line leading from said source to said selector valve, a variable pressure line leading from said selector valve, means responsive to movement of said selector valve to vary the fluid pressure in said variable pressure line, means responsive to such pressure variation to direct fluid flow to a selected one of said inlet ports, said last-named means comprising a control valve assembly comprising a plurality of individual valves operable to achieve three different valve combinations or settings, to one of which settings said valve assembly is moved in response to full pressure in said variable pressure line, to another in response to zero pressure in said variable pressure, and to the third in response to a predetermined intermediate pressure, and pressure-responsive motor means for shifting said control valve assembly, said shifting means comprising a pair of rocker arms pivotally mounted on opposite sides of said valve assembly, means connecting said rocker arms to the individual valves of said valve assembly, and actuating means interposed between and in abutment with said rocker arms, to rock the latter, said interposed means comprising a member having parts of different diameters, and major and minor plungers in said parts, for alternate movement in opposite directions according to the pressure existing in said variable pressure line.

2. A valve assembly comprising a plurality of individual valves operable to achieve three different valve combinations or settings, and pressure responsive means for actuating said individual valves, said actuating means comprising a pair of rocker arms pivotally mounted on opposite sides of said valve assembly, means connecting said rocker arms to the individual valves, to shift the latter, and reciprocable means interposed between and in abutment with said rocker arms to rock the latter, said reciprocable means comprising a member having parts of different diameters, and major and minor plungers in said parts, for alternate movement in opposite directions according to the pressure exerted thereupon.

PETER WARBORN THORNHILL.